United States Patent [19]

Broughton

[11] 4,232,826
[45] Nov. 11, 1980

[54] LIQUID SLUDGE DISPOSAL

[75] Inventor: Michael Broughton, Spalding, England

[73] Assignee: Farrow Irrigation Limited, England

[21] Appl. No.: 32,919

[22] Filed: Apr. 24, 1979

Related U.S. Application Data

[63] Continuation-in-part of Ser. No. 821,216, Aug. 2, 1977, abandoned.

[51] Int. Cl.$^3$ .................. B05B 3/18; B05B 15/02; B65H 75/34
[52] U.S. Cl. .................. 239/112; 137/355.19; 137/355.21; 239/196; 239/197
[58] Field of Search .............. 239/112, 195, 196–199, 239/212, 188, 189; 137/355.18, 355.19, 355.2, 355.21, 355.26

[56] References Cited

U.S. PATENT DOCUMENTS

| | | | |
|---|---|---|---|
| 1,761,191 | 6/1930 | Browning | 137/355.19 X |
| 2,044,039 | 5/1936 | Woodcock | 239/112 |
| 2,518,990 | 8/1950 | Keener | 137/355.2 |

FOREIGN PATENT DOCUMENTS

| | | | |
|---|---|---|---|
| 2255010 | 7/1975 | France | 239/199 |
| 716026 | 10/1966 | Italy | 239/199 |
| 498037 | 4/1976 | U.S.S.R. | 239/112 |

OTHER PUBLICATIONS

*Land Reclamation*, vol. 40, No. 5, Part 1, May 1968, pp. 801, 802, Heil et al., "Partial List of Areas Utilizing Sewage Wastes".

*Primary Examiner*—Andres Kashnikow
*Attorney, Agent, or Firm*—Ostrolenk, Faber, Gerb & Soffen

[57] ABSTRACT

A sludge sprayer comprises a land sledge with spray gun and a mobile winching hose reel with power coupling for connection to a tractor power take-off. The sprayer has a compressor which fills an air reservoir automatically when the apparatus is in use. A release mechanism is provided to release the compressed air in the reservoir through the hose to the spray gun, thus emptying substantially of the sludge therein, when pumping of the liquid sludge ceases. An automatic stop mechanism decouples the winching hose reel from the power take-off upon return of the sledge to the reel.

4 Claims, 3 Drawing Figures

LIQUID SLUDGE DISPOSAL

This is a continuation-in-part of application Ser. No. 821,216, filed Aug. 2, 1977.

This invention relates to the disposal of liquid sludge by spraying it on the land. The invention particularly relates to apparatus for use in a sludge dispersal process of this type.

Liquid sludge has been disposed of on the land for many years. In the conventional method, sludge is carried to the site in lorry-mounted or tractor-powered sludge tankers, from which it is pumped to the disposal area. The even distribution of sludge, especially during wet weather, presents a problem with this system however, since the heavy equipment cannot be easily moved over the ground. Pumps and portable pipe lines for spreading the sludge has been proposed, but these systems are generally labour intensive and are difficult to move from one site to another.

Liquid sludge is gaining increasing acceptance as a source of agricultural fertiliser and thus the disposal of the sludge onto agricultural land is particularly desirable, not only as a means of improving the land, but also as a means of disposing the unwanted sludge.

There is thus a real need for a simple portable sludge disposal system which can be used under wet conditions and which does not involve the transport of heavy equipment over the ground.

We have now developed a simple apparatus for spreading liquid sludge over wide areas in a uniform manner without the need to bring heavy tankers onto the ground, which meets this need.

According to the present invention, we provide apparatus for liquid sludge disposal, comprising:

a land sledge having mounted thereon a sludge spray gun;

a mobile winching hose reel having a power coupling for connection to a tractor power take-off to provide winching power, and arranged for connection to a pumped supply of liquid sludge;

a flexible drag hose connecting said sledge and said gun to said winching hose reel for feeding said pumped supply of sludge to said gun;

a compressor coupled to an air reservoir and arranged to fill the reservoir with compressed air automatically when the apparatus is in use;

a release mechanism arranged to release said compressed air from the reservoir through said hose and said gun, thus emptying substantially all of the sludge in said hose and said gun, when pumping of said liquid sludge ceases; and an automatic stop mechanism for decoupling said winching hose reel from said power take-off, said automatic stop mechanism being arranged to be actuated by return of said sledge to said reel.

The sludge spray gun is conveniently a sectoring gun, that is to say one which rotates in a reciprocal fashion to spray the sludge in a wide sector, for example a sector of about 200°. It is mounted on a sledge, rather than any kind of wheeled carrier, so that it can be used over any terrain, whether rough or smooth. The apparatus is thus ideally suited to use on rough pasture or on ploughed land.

The hose reel should be large enough to accommodate the length of hose required, and for most agricultural uses should preferably accommodate up to 700 feet (213 meters) of hose. The hose reel is conveniently mounted with its axis horizontal and perpendicular to the line of travel of the sledge. The hose itself should be sufficiently robust to enable the sledge and gun to be dragged in under the winching action and is conveniently constructed of a heavy duty thermoplastics material such as PVC or a polyalkylene.

The air reservoir should be of a sufficient size and strength to contain the air required to blow the sludge out of the entire hose. When using a hose of 700 feet (213 m) long and about 4 in (100 mm) diameter having a volume of about 60 ft$^3$(1.7 m$^3$), the air reservoir is conveniently about 20 ft$^3$(0.565 m$^3$) in volume and able to stand a pressure of up to 70 psi (5 kg/cm$^2$). We have found that at this pressure, a volume of 20 cubic feet is efficient in blowing out residual sludge in a hose of this size. In other words, it is convenient if the air reservoir volume is approximately one third of the volume of the hose.

The release mechanism for the compressed air conveniently includes a valve. Such a valve can be one operated by a drop in pressure in the sludge supply. For example, by using a combination of non-return valves the air reservoir can be held full under pressure while the sludge pressure is above a predetermined level. A drop in the sludge pressure below this critical level can then be used to actuate the release valve, thus connecting the air supply in the reservoir to the hose.

The winching mechanism is provided with an automatic stop mechanism actuated by the return of the sledge. In a particularly advantageous arrangement, the hose reel mount is provided with a pressure bar extending perpendicularly to the line of travel of the sledge. The pressure bar is connected to a slave hydraulic cylinder arranged to operate the winching mechanism. Such connection is made in conventional manner e.g. by employing an actuating cylinder linked to the pressure bar and hydraulically connected to the slave cylinder.

At the start of the spraying operation the hose is extended and the sledge is at a point distant from the hose reel. While the sludge is being pumped to the spray gun, the sledge is being winched towards the hose reel and the hose is wound in. As the sledge reaches the hose reel, the pressure bar is depressed and the automatic stop mechanism is actuated. Depression of the pressure bar causes hydraulic fluid to be driven from the actuating cylinder to the slave cylinder to decouple the reel from the power take-off, e.g. by disengaging a clutch of the power coupling.

It will be seen that the apparatus according to the present invention is of relatively light weight, as compared with sludge tankers, and can be easily transported by a small agricultural tractor of, say, 35 to 40 hp. Conveniently, the sledge is arranged to couple onto the hose reel and winching mechanism, so that both can be towed by the tractor to the desired site. Sludge is supplied to the apparatus by a portable pipe work which can be laid along one side of the field to be sprayed for connection to a road tanker at the field gate. The portable pipe work can be conventional aluminium or thermoplastics pipework conventionally used in field irrigation.

Thus, to spray sludge over a field of up to 700 feet (213 m) long, a portable main pipe is laid along on one end of the field, conveniently with hydrants or takeoff points at appropriate intervals along its length. A tractor then tows the apparatus to the far end of the field and drops the sledge which is anchored in position. The tractor then returns to the other end of the field laying the hose as it moves. The main pipe line is then connected to the apparatus. A supply of liquid sludge can then be pumped from a tanker on a near by road or track, along the main pipe-work to the hose reel.

When the pumping of the sludge commences, the anchor on the sledge is released and the sledge is slowly winched towards the hose reel at a speed determined by the volume of sludge to be applied to the strip land being treated. When the sledge reaches the hose reel, the pressure bar is depressed and the drive mechanism is stopped. The pumping of the sludge is also discontinued, whereupon the air in the air reservoir is released through the hose and gun, thus emptying the sludge remaining in the system.

In order to spray the next section of the field, it is then simply necessary for the tractor to pull the coupled sledge and hose reel to the far end of the next strip of field and repeat the process.

It will be seen that the entire process can be operated by one man driving the tractor, together with the tanker driver. In fact it is possible for one man to do both jobs. Little manual labour is involved as the movement of the equipment and the repositioning for each traverse of the field is accomplished with the aid of the tractor.

The application of the sludge is completely controllable and the amount supplied to the field can be controlled by the rate at which the sludge is pumped to the apparatus and the rate at which the sludge is winched.

If the contents of several tankers is to be sprayed, it is convenient to use a suitable diesel engine driven pump at the roadside connection point, to which the tankers can be connected in turn.

In another preferred embodiment of the apparatus according to the present invention, the sledge anchor is arranged to be actuated by the sludge flow itself. In this embodiment, the anchor conveniently takes the form of an arm pivoted on the top of the sledge so that in an upright position, the bottom end of the arm presses into the ground. The arm is preferably spring-loaded so that it is urged towards the horizontal position but held in a vertical position by a catch arranged to be released by the sludge flow.

In this embodiment, there is no need for an independent remote control mechanism to release the anchor: the anchor is automatically released as soon as the sludge is pumped to the gun.

The invention will now be further described with reference to the accompanying drawings in which:

FIG. 2 is a perspective view of the apparatus showing the hose fully reeled in.

Figure 1:
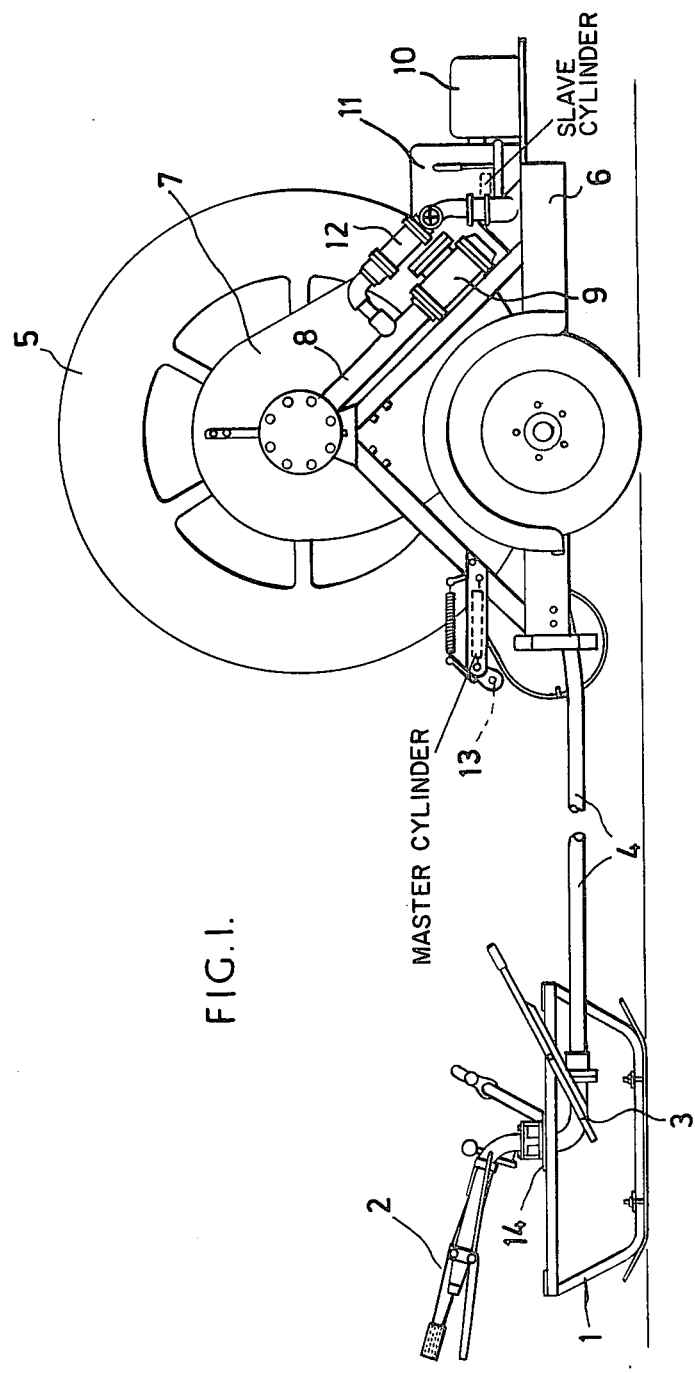
FIG. 1 is a side elevation of liquid sludge disposal apparatus according to the present invention with the hose extended.
Figure 2:
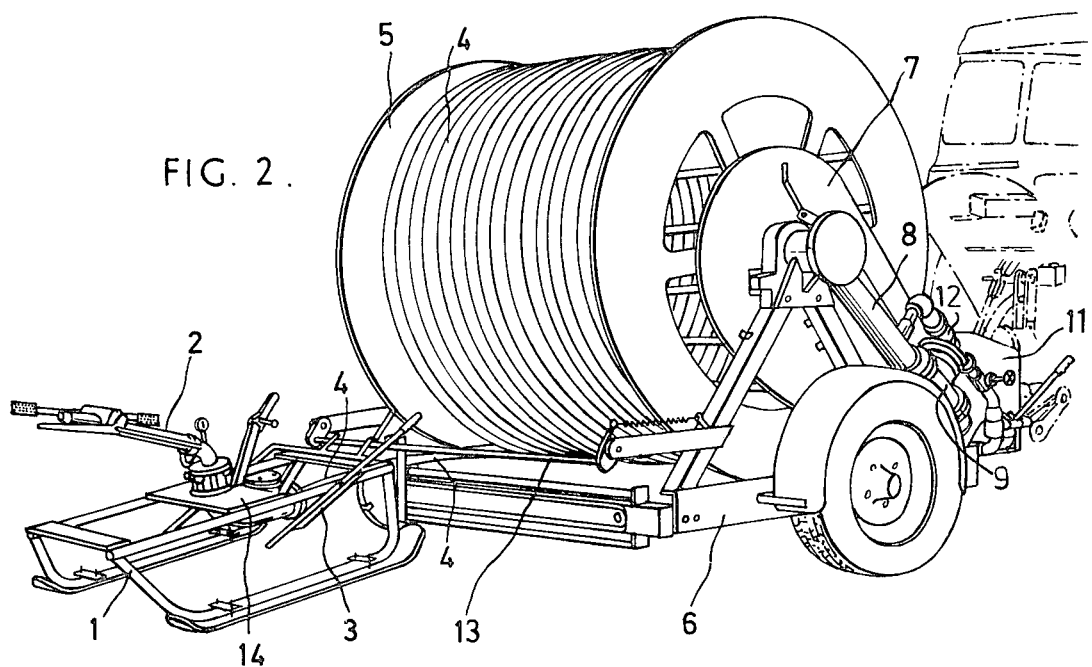

Referring to FIGS. 1 and 2 of the accompanying drawings, it will be seen that the apparatus comprises a land sledge 1 having mounted thereon a sludge gun 2 of the type which automatically sectors through a predetermined arc. The sledge 1 is fitted with an anchor post 3 which is pivoted on a top bar. The sledge 1 and gun 2 are connected by a drag hose 4 to a winching hose reel 5 mounted on a two-wheeled trailer 6. The hose reel 5 is arranged to be driven via a chain drive 7 which is powered from a tractor power take-off ('PTO'). A power coupling of conventional construction is employed to couple the apparatus to the PTO.

A liquid sludge supply pipe 8 with valve 9 connects to the axis of the hose reel to supply sludge to the inner end of the hose.

Also mounted on the trailer 6 is a compressor 10 and an air reservoir 11. The air reservoir 11 interconnects via a valve 12 with the sludge supply pipe 8.

Also mounted on the trailer 6 is a pressure bar 13 arranged to actuate a hydraulic actuating cylinder connected hydraulically to a slave cylinder at the power coupling.

On the sledge, the anchor post 3 is interconnected with a flow sensing device 14 arranged to release the anchor post 3 when sludge flows to the gun 2. By way of simple example, the flow sensing device can be a flap valve in the flow path of the sludge and with an external lever mounted on the pivot axis of the valve for pivotal movement therewith. It can then be arranged that pivoting of the lever with the flap upon flow of sludge causes a catch to be tripped which thereby releases the anchor post 3.

Figure 3:
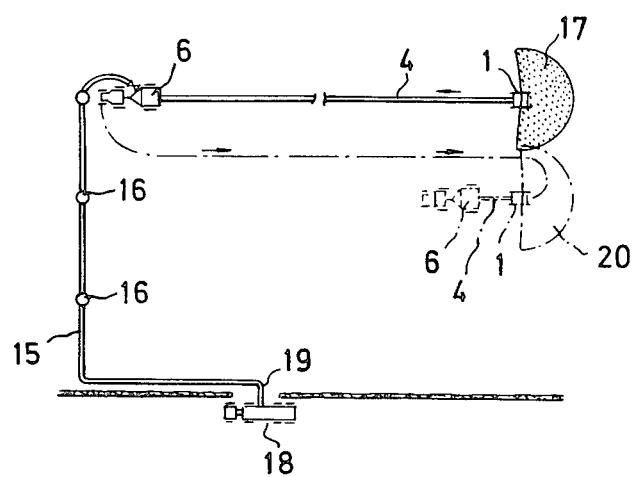
FIG. 3 is a plan diagram of the field lay out and spraying pattern.

Referring now to FIG. 3 as well, a portable aluminium main or flexible drag hose 15 is laid from the field gate along one end of the field. At suitable intervals along the main or hose 15 are supplied hydrants 16.

In order to spray a first strip of the field, the sludge disposal apparatus is towed by a tractor to the starting position 17 and the sledge 1 is disconnected and the anchor post 3 actuated to hold the sledge 1 in place. The tractor then tows the trailer 6 to the terminal hydrant on the main 15, laying the hose 4. Sludge is brought to the field gate in a tanker 18 and is supplied to the main 15 by a flexible hose 19. The sludge is pumped to the apparatus by the tanker, or by an independent diesel powered power at the field gate.

When pumping commences, the liquid flows actuates the control 14 and releases the anchor post 3. The winching mechanism is then started by coupling it to the tractor power take-off. Power is also supplied to the air compressor 9 which then automatically charges up the air reservoir 11, to 60 or 70 psi (4 or 5 kg/cm$^2$) pressure.

The sledge 1 is slowly drawn towards the trailer 6 as the hose 4 is reeled, thus spraying sludge over a generally rectangular strip of the field. A tanker fitted with a pump unit capable of discharging 40 to 60 m$^3$/H (8800–13200 gallons per hour) with a pressure range of 4.2 to 7.0 kg/cm$^2$ (60 to 100 psi) can enable the sludge to be spread over a strip 46 m (150 feet) in width.

When the hose 4 is fully reeled in, the sledge 1 is pulled against the pressure bar 13, thus actuating the hydraulic actuating cylinder. Hydraulic fluid is urged from the actuating cylinder to a slave cylinder at the power coupling. Such a slave cylinder then decouples in known manner the power coupling from the PTO. Decoupling from the PTO means that the winching power is then cut off.

It will be appreciated that it is then necessary to turn off the supply of pumped sludge. This drop in pressure can be used to effect release of the compressed air in the air reservoir 11. The valves 9 and 12 can take various forms, but if they are non-return ball valves they can constitute an automatic release mechanism for the compressed air. Thus, it can readily be arranged that when the sludge pressure is sufficiently high it will open the valve 9 and close the valve 12. A drop in the sludge pressure, as when the supply is turned off, then results in that the air pressure in reservoir 11 is sufficient to move the ball in valve 12 and opens the valve 12. The air then closes the valve 9 in the sludge supply pipe 8 and the air empties through the hose 4 and gun 2, thus discharging the remaining sludge therein.

To spray the next strip of the field, the tractor then tows the trailer 6 and sledge 1 to the next position 20 and the process is repeated.

It will be seen that the only equipment which enters the field is the tractor and the sludge disposal apparatus according to the invention. The heavy tanker remains in the road, and the entire operation in the field is operated by one man.

There has thus been described a simple portable sludge disposal system. The various components are not in themselves of intricate nature and a competent engineer will meet with no undue protracted difficulties in constructing the working apparatus.

While the above description particularly relates to a preferred embodiment of the invention, it is not intended that the invention is limited thereto. For example, the valves 9,12 need not be non-return ball valves.

I claim:

1. Apparatus for liquid sludge disposal, comprising
   a land sledge having mounted thereon a sludge spray gun;
   a mobile winching hose reel having a power coupling for connection to a tractor power take-off to provide winching power, and arranged for connection to a pumped supply of liquid sludge;
   a flexible drag hose connecting said sledge and said gun to a said winching hose reel for feeding said pumped supply of sludge to said gun;
   a compressor coupled to an air reservoir and arranged to fill the reservoir with compressed air automatically when the apparatus is in use;
   a release mechanism arranged to release said compressed air from the reservoir through said hose and said gun, thus emptying substantially all of the sludge in said hose and said gun, when pumping of said liquid sludge ceases; and
   an automatic stop mechanism for decoupling said winching hose reel from said power take-off, said automatic stop mechanism being arranged to be actuated by return of said sledge to said reel.

2. Apparatus according to claim 1, in which the air reservoir volume is approximately one third of the volume of the hose.

3. Apparatus according to claim 1, in which the release mechanism comprises a valve operated by a drop in pressure in the sludge supply.

4. Apparatus according to claim 1, in which said stop mechanism comprises a pressure bar provided on the hose reel mount and extending perpendicularly to the line of travel of the sledge and connected to a slave hydraulic cylinder arranged to operate the winching mechanism, whereby when the pressure bar is depressed, the automatic stop mechanism is actuated.

* * * * *